Patented Dec. 5, 1950

2,533,189

UNITED STATES PATENT OFFICE 2,533,189

HYDRAZO ESTERS

Paul J. Flory, Kent, and Norman Rabjohn, Akron, Ohio, assignors to Wingfoot Corporation, Akron, Ohio, a corporation of Delaware No Drawing. Application January 16, 1946, Serial No. 641,651

8 Claims. (Cl. 260—482)

This invention relates to a new group of chemical compounds having valuable properties as hereinafter described. More specifically, the invention relates to new esters having a plurality of hydrazo radicals (—NH—NH—) and to methods for their preparation.

The purpose of this invention is to provide a new class of chemical compounds which are useful as intermediates in the preparation of valuable polyazo compounds. A further purpose of this invention is to provide methods of synthesizing polyhydrazo derivatives.

The new compounds have the general structural formula $$R\!-\!\left[O\!-\!\overset{O}{\underset{\|}{C}}\!-\!NH\!-\!NH\!-\!\overset{O}{\underset{\|}{C}}\!-\!OR'\right]_x$$

in which R' may be a monovalent hydrocarbon radical, such as alkaryl, alkyl, aralkyl, aryl, a monovalent oxa-hydrocarbon radical such as alkoxyalkyl, aryloxyalkyl or alkoxyaryl radicals, a thiahydrocarbon radical such as

[C₂H₅—S—C₂H₄—]

and

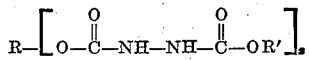

or any of the corresponding halo- and nitro-substituted radicals, and in which R is a multivalent hydrocarbon radical, such as the alkylene, arylene, alkyl arylene, a multivalent oxa-hydrocarbon radical, such as the polyalkylene glycol radicals, the divalent arylene ether radicals, and the mixed alkylene arylene ether radicals, the multivalent thiahydrocarbon radicals, such as (—alkylene—S—alkylene—), and the corresponding alkyl-, halo-, and nitro-substituted radicals, and in which $x$ is a small whole number greater than one but preferably from two to five inclusively.

The monovalent radical designated as R' in the above structural formula may be an alkyl radical, such as methyl, ethyl, hexyl, cetyl and melissyl radicals, an aryl radical such as phenyl and naphthyl radicals, an aralkyl radical, such as benzyl, phenylethyl and naphthylmethyl radicals, a cycloalkyl radical, such as cyclohexyl and cyclopentyl, an alkoxyalkyl radical, such as 2-methoxyethyl, 2-ethoxyethyl, and the 2-isopropoxy-n-propyl, a thia-alkyl radical, such as (CH₃—S—CH₂—), an alkoxyaryl radical, such as methoxyphenyl and ethoxynaphthyl radicals, and the alkyl-, halo-, and nitro-substituted radicals, such as tolyl, xylyl, 2-chloroethyl, 3-bromopropyl, fluoromethyl, para-chlorophenyl, meta-ethylphenyl, 2-nitroethoxymethyl, and 2,4-dinitrobenzyl radicals.

The multivalent radical designated as R in the above structural formula may be any alkylene radical, such as ethylene, hexamethylene, decamethylene, and 1,2-propylene radicals, the oxa-alkylene radicals, such as the radical (—C₂H₄—O—C₂H₄—)

derived from diethylene glycol, the radical (—C₂H₄—O—C₂H₄—OC₂H₄—)

derived from triethylene glycol and the corresponding thio ether alkylene radicals, such as (—C₂H₄—S—C₂H₄—S—C₂H₄—) an arylene radical, such as the para-phenylene radical and the various naphthylene radicals, a divalent radical having both aryl and aliphatic characteristics, such as Tolylene 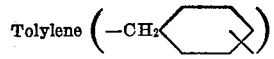

Toluylene 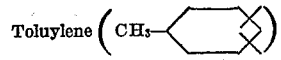

Xylylene 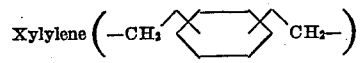

Diphenylene methane 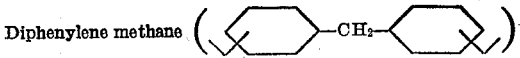

and 2,2 bis (diphenylene 1,4) propane 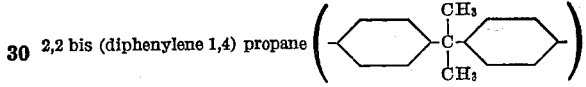

the halo-, alkyl-, and nitro-substituted derivatives of any of the above radicals, a radical having a valence greater than two, such as glyceryl, pentaerythryl (the quadrivalent radical derived from pentaerythritol) and similar aliphatic or aromatic hydrocarbons, thiahydrocarbons or oxahydrocarbons, and the corresponding alkyl-, halo-, or nitro-substituted radicals.

The new hydrazo esters are prepared by reacting a polychloro carbonate of a polyhydroxy compound having the desired multivalent radical of the types above described, with an ester of hydrazine monocarboxylic acid wherein the carboxylate radical is linked to the desired monovalent radical of the types described above, thereby producing compositions containing a plurality of hydrazo radicals (—NHNH—).

The polychlorocarbonates are prepared by reacting any polyhydroxy compound, involving the desired polyvalent radical as above described, with phosgene until all of the hydroxy radicals, or at least a plurality of the hydroxy radicals, are substituted with chlorocarbonate radicals

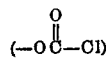

The polychlorocarbonates are preferably prepared by adding the polyhydroxy compound gradually to an excess of liquid phosgene while maintaining a temperature below 10° C. for the purpose of removing the heat of reaction, as well as to retain the phosgene in liquid state. It is desirable to surmount the reaction flask with a reflux condenser cooled below the boiling point of phosgene for the purpose of condensing the phosgene gas and returning the same to the reaction vessel. Some of the dichlorocarbonates may be purified by distillation, although many can be satisfactorily purified by washing with water, or by warming to remove excess phosgene and hydrogen chloride.

The polyhydroxy compounds having aryl-ring-substituted hydroxy radicals may also be used in the preparation of polychlorocarbonates but the presence of a basic reagent is then also required. Suitable basic reagents are the tertiary amines, such as pyridine and triethylamine and the alkali or alkali earth metal hydroxides, carbonates, or oxides, such as sodium hydroxide and potassium carbonate.

The esters of hydrazo monocarboxylic acids may be prepared by reacting hydrazine hydrate with the carbonic acid ester having the monovalent organic radical desired in the final composition. Thus, diphenyl carbonate, diethyl carbonate, dibenzyl carbonate and any other carbonate ester may be reacted with an equal molecular proportion of hydrazine hydrate. The reaction takes place immediately, although generally it is desirable to stir the reaction mass and heat it slightly to complete the reaction.

$$R'-O-\overset{O}{\underset{\|}{C}}-O-R'' + H_2N-NH_2(H_2O) \longrightarrow$$

$$H_2N-NH-\overset{O}{\underset{\|}{C}}-O-R' + H_2O + R'OH$$

The resulting ester is usually a solid which can be separated from the reaction mass by adding water and then recrystallized from alcohol solutions.

The condensation of the polychlorocarbonates with the esters of hydrazine monocarboxylic acid are conducted in a solution of a suitable solvent, such as dioxane, and in the presence of a basic reagent, such as dimethylaniline, pyridine or other tertiary amine, or the oxides, carbonates, or hydroxides of an alkali or an alkali earth metal.

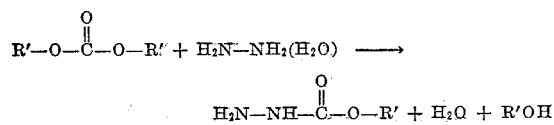

The resulting bis hydrazo ester may then be separated by adding water to the reaction mass and purified by recrystallization, for example from ethyl acetate or a mixture of ethyl acetate and petroleum ether.

The following are examples of compounds which may be prepared in accordance with this invention:

Decamethylene-bis(-ethyl hydrazodicarboxylate)

$$C_2H_5-O-\overset{O}{\underset{\|}{C}}-NH-NH-\overset{O}{\underset{\|}{C}}-O-(CH_2)_{10}-O-\overset{O}{\underset{\|}{C}}-NH-NH-\overset{O}{\underset{\|}{C}}-O-C_2H_5$$

Diethylene-bis(-phenyl hydrazodicarboxylate)

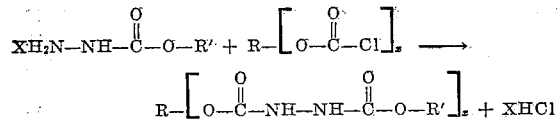

Glyceryl-tris(benzyl hydrazodicarboxylate)

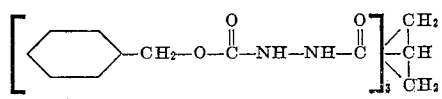

Para-phenylene-bis(cyclohexylhydrazo dicarboxylate)

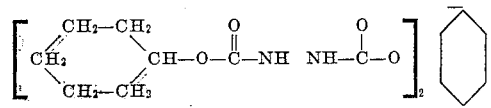

Thiodiethylene-bis(gamma-chloropropylhydrazo dicarboxylate)

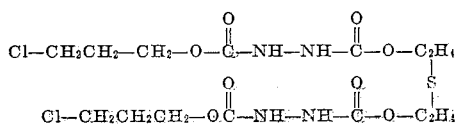

Para-xylylene-bis(beta-methoxyethyl-hydrazo-dicarboxylate)

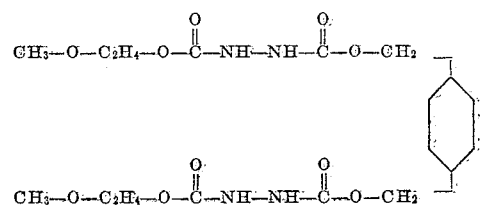

2,2-p,p' di(hydroxyphenyl))propane bis(p-nitro phenyl hydrazo dicarboxylate) ester

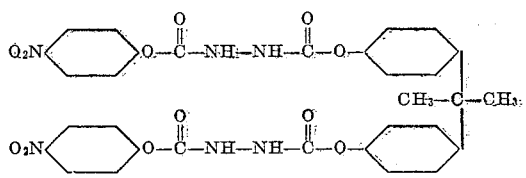

The new bis hydrazo compounds described above are useful as intermediates in the preparation of bis azo derivatives which are capable of curing rubber without heat. In copending application Serial No. 641,650, filed January 16, 1946, by Paul J. Flory and Norman Rabjohn there are described and claimed methods of preparing the bis azo derivatives. In copending application Serial No. 641,652, filed January 16, 1946, by Paul J. Flory and Norman Rabjohn, now U. S. Patent 2,469,819, there are described and claimed methods of vulcanizing rubber by means of the bisazo esters.

Further details of the preparation of the bis hydrazo compounds are set forth in the following specific examples.

*Example 1*

One mole of benzyl alcohol (108 grams) was placed in a one liter three-necked flask equipped with a stirrer and a dropping funnel. The flask was cooled by immersion in an ice bath while a solution of 50 grams of phosgene in 250 cc. of toluene and 79 grams of pyridine were added gradually. After all of the reagents had been mixed thoroughly the reaction mass was warmed to 50° C. and then allowed to cool. The pyridine hydrochloride which was precipitated during the reaction was removed by filtration, and the filtrate distilled under reduced pressure. A substantial proportion of dibenzyl carbonate was obtained (B. P. 175–180° C. at 4 mm.). A mixture of 35.5 grams of dibenzyl carbonate and 10.5 grams of 85 percent hydrazine hydrate was stirred and warmed until a homogeneous solution resulted. It was allowed to stand overnight at room temperature and then poured into 100 cc. of water to form two liquid phases. The non-aqueous phase was separated and heated at 100° C. and 3 mm. pressure for four hours. The residue solidified upon cooling and the hydrazine monocarboxylic acid benzyl ester was separated (M. P. 63–65° C.). A portion of the ester (10.4 grams) was dissolved in 75 cc. of dioxane in a flask and solutions of 4.76 grams of potassium hydroxide in 50 cc. of water and 10 grams of p-phenylene dichlorocarbonate in 150 cc. of dioxane were added gradually thereto. The reaction mixture was stirred without cooling and the heat of reaction caused an appreciable increase in temperature. After the reaction mass had cooled to room temperature it was poured into 600 cc. of water. A solid compound was obtained which was purified by crystallization from alcohol solution (M. P. 186–187° C.) and was identified as para phenylene bis(benzyl hydrazodicarboxylate) having the structure:

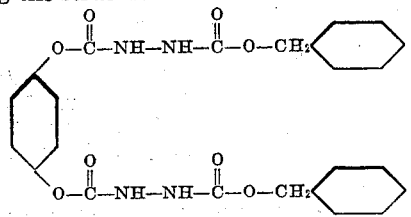

Example 2

Using an apparatus similar to that described in the preceding example, a solution of 20.8 grams of hydrazine monocarboxylic acid ethyl ester in 200 cc. of dioxane was placed in a flask. Then a solution of 23.1 grams of diethylene glycol dichlorocarbonate in 25 cc. of dioxane, and 20.2 grams of triethylamine dissolved in 25 cc. of dioxane were added simultaneously. The reaction mixture was stirred while the reactants were being combined and after the combination was complete the reaction mass was warmed for 45 minutes. After cooling to room temperature the solid triethylamine hydrochloride was removed by filtration; the dioxane was evaporated under reduced pressure and the diethylene glycol bis-(ethyl hydrazo-dicarboxylate) so obtained was recrystallized from ethyl acetate (M. P. 130–132° C.). The compound had the following structure:

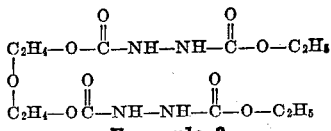

Example 3

Using a procedure analogous to those described in the preceding examples, a solution of 12 grams of hydrazine monocarboxylic acid methyl ester in 200 cc. of dioxane was placed in a flask. Solutions of 20 grams of decamethylene dichlorocarbonate and 13.5 grams of triethylamine in dioxane were added thereto. After the reaction mass had cooled to room temperature, the precipitate was removed and the filtrate concentrated on a steam bath at reduced temperatures. The residue was crystallized from ethyl acetate. The resulting hydrazo ester was a white crystalline solid having a M. P. of 112–114° C. It was identified as the bis(methyl hydrazo-dicarboxylate) ester of decamethylene glycol having the following structure:

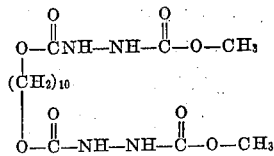

Example 4

To a solution of 50 grams (0.5 mole) of phosgene in 500 cc. of dry toluene were added dropwise solutions of 57 grams (0.25 mole) of 2,2-bis p,p'di(hydroxyphenyl) propane in 250 cc. of dioxane and 60.5 grams (0.5 mole) of dimethyl-aniline dissolved in 60 cc. of dioxane. The reaction mixture became warm and was subsequently heated on a steam bath for three hours. It was allowed to stand several hours and a precipitate of dimethyl aniline hydrochloride formed. This precipitate was removed by filtration and the filtrate concentrated under reduced pressure. There was obtained 67 grams of an oil which gradually solidified; M. P. 88–90° C. It was the bis-chloroformate ester of 2,2-(p,p'-di(hydroxy-phenyl)) propane.

To a solution of 20.8 grams (0.2 mole) of hydrazine monocarboxylic acid ethyl ester in 100 cc. of dioxane were added 35.3 grams (0.1 mole) of 2,2-(p,p'-di(hydroxyphenyl)) propane bis-chloroformate dissolved in 185 cc. of dioxane and 20.2 grams (.2 mole) of triethylamine, dissolved in 100 cc. of dioxane. After all had been added, the mixture was stirred for an hour, filtered to remove the precipitate of amine hydrochloride, and the filtrate concentrated. The residue was dissolved in a mixture of ethyl acetate and hexane and allowed to stand. A white solid gradually precipitated. There resulted 28.3 grams of material which melted at 169 to 171° C.

The compound was identified as 2,2-(p,p' di(hydroxyphenyl))propane bis(ethyl hydrazo dicarboxylate) ester having the structure:

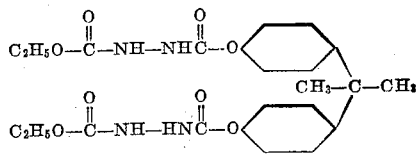

Other polyhydrazo compounds may be prepared by reacting polychlorocarbonate esters with hydrazine. Such compounds prepared from dichlorocarbonates are linear polymers and have the structure:

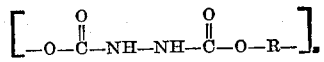

Other cross-linked polymers can be prepared from polychlorocarbonates having three or more chlorocarbonate groups. Such polymers may be defined structurally as follows:

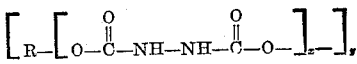

where $x$ represents the valence of R and is greater than one, and $y$ represents the number of R molecules in a polymer chain.

Although the invention has been described with respect to specific modifications, it is not intended that the invention shall be limited by the details thereof except to the extent incorporated in the following claims.

We claim:

1. As a new composition the compound having the structural formula

wherein R is a polyvalent radical of the group consisting of hydrocarbon, oxahydrocarbon and thiahydrocarbon radicals and the corresponding nitro- and halogen-substituted radicals, R' is a monovalent radical of the group consisting of hydrocarbon, oxahydrocarbon and thiahydrocarbon radicals and the corresponding nitro- and halogen-substituted radicals, the oxygen atoms being connected to carbon atoms in R and R', and $x$ is a small whole number between 2 and 5 inclusive.

2. As a new chemical compound the compound having the structural formula

wherein R is a polyvalent hydrocarbon radical, R' is a monovalent hydrocarbon radical and $x$ is a small whole number between 2 and 5 inclusive.

3. As a new chemical compound diethylene glycol bis(ethyl hydrazo dicarboxylate).

4. As a new chemical compound decamethylene bis(methyl hydrazo dicarboxylate).

5. As a new chemical compound p-phenylene bis(benzyl hydrazo dicarboxylate).

6. A method of preparing a compound having the structural formula

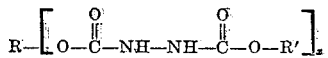

wherein R is a polyvalent radical of the group consisting of hydrocarbon, oxahydrocarbon and thiahydrocarbon radicals and the corresponding nitro- and halogen-substituted radicals, R' is a monovalent radical of the group consisting of hydrocarbon, oxahydrocarbon and thiahydrocarbon radicals and the corresponding nitro- and halogen-substituted radicals, the oxygen atoms being connected to carbon atoms in R and R', and $x$ is a small whole number between 2 and 5 inclusive, which comprises reacting the compound

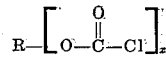

with $x$ molecular equivalents of the compound

in the presence of a basic reagent, R, R' and $x$ being as above defined.

7. As a new chemical compound, an alkylene bis (alkyl hydrazo dicarboxylate).

8. As a new chemical compound, a polyalkylene glycol bis (alkyl hydrazo dicarboxylate).

PAUL J. FLORY.
NORMAN RABJOHN.

REFERENCES CITED

The following references are of record in the file of this patent:

UNITED STATES PATENTS

| Number | Name | Date |
| --- | --- | --- |
| 1,817,992 | Leopold et al. | Aug. 11, 1932 |
| 2,378,571 | Moldenhauer et al. | June 19, 1945 |
| 2,401,549 | Chenicek | June 4, 1946 |

OTHER REFERENCES

Diels et al.: "Berichte," vol. 44 (1911), p. 3025.